(12) United States Patent
Yu et al.

(10) Patent No.: US 11,586,067 B2
(45) Date of Patent: *Feb. 21, 2023

(54) STRUCTURE AND METHOD OF ADVANCED LCOS BACK-PLANE HAVING ROBUST PIXEL VIA METALLIZATION

(71) Applicant: Applied Materials, Inc., Santa Clara, CA (US)

(72) Inventors: Lan Yu, Albany, NY (US); Benjamin D. Briggs, Cllfton Park, NY (US); Tyler Sherwood, Fonda, NY (US); Raghav Sreenivasan, Fremont, CA (US)

(73) Assignee: Applied Materials, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/100,407

(22) Filed: Nov. 20, 2020

(65) Prior Publication Data

US 2022/0163845 A1 May 26, 2022

(51) Int. Cl.
*G02F 1/1335* (2006.01)
*G02F 1/1362* (2006.01)

(52) U.S. Cl.
CPC .. *G02F 1/133553* (2013.01); *G02F 1/136227* (2013.01); *G02F 1/136277* (2013.01)

(58) Field of Classification Search
CPC ......... G02F 1/136277; G02F 1/133553; G02F 1/136227; H01L 21/76879; H01L 23/5226
See application file for complete search history.

(56) References Cited

U.S. PATENT DOCUMENTS

| 5,170,407 | A | | 12/1992 | Schubert et al. | |
|---|---|---|---|---|---|
| 5,892,563 | A | * | 4/1999 | Ono | G02F 1/136277 349/114 |
| 6,008,876 | A | * | 12/1999 | Moore | G02F 1/13439 430/311 |
| 6,333,519 | B1 | | 12/2001 | Nakazawa | |
| 6,356,332 | B1 | * | 3/2002 | Ichikawa | G02F 1/136227 349/146 |

(Continued)

FOREIGN PATENT DOCUMENTS

| CN | 101398579 B | 4/2009 |
|---|---|---|
| CN | 101866083 B | 10/2010 |

(Continued)

OTHER PUBLICATIONS

International Search Report and Written Opinion dated Mar. 4, 2022 in International Patent Application No. PCT/US2021/059737, 8 pages.

(Continued)

*Primary Examiner* — Jia X Pan
(74) *Attorney, Agent, or Firm* — Kilpatrick Townsend & Stockton LLP (57) ABSTRACT

Processing methods may be performed to form a pixel material in a semiconductor substrate. The methods may include forming a lithographic mask overlying the semiconductor substrate. The lithographic mask may include a window. The method may include forming a via in the semiconductor substrate by a dry etch process through the window. The method may also include forming the pixel material by depositing a fill material in the via.

18 Claims, 7 Drawing Sheets

(56) References Cited

U.S. PATENT DOCUMENTS

| | | | |
|---|---|---|---|
| 6,435,942 B1 | 8/2002 | Jin et al. | |
| 6,577,362 B1 | 6/2003 | Moore | |
| 6,795,144 B1* | 9/2004 | Okuda | G02F 1/136227 349/137 |
| 2001/0045999 A1 | 11/2001 | Nakazawa et al. | |
| 2002/0126233 A1* | 9/2002 | Yamagishi | G02F 1/136227 349/43 |
| 2004/0017537 A1 | 1/2004 | Magana et al. | |
| 2007/0026557 A1 | 2/2007 | Yu et al. | |
| 2007/0026679 A1 | 2/2007 | Yu et al. | |
| 2007/0170430 A1* | 7/2007 | Nakagawa | G02F 1/136227 257/66 |
| 2007/0175104 A1 | 8/2007 | Nishiyama et al. | |
| 2007/0284627 A1* | 12/2007 | Kimura | G02F 1/136227 257/257 |
| 2007/0287211 A1 | 12/2007 | Wu | |
| 2011/0237009 A1 | 9/2011 | Huang et al. | |
| 2012/0081645 A1* | 4/2012 | Yoshimura | G02F 1/136209 445/24 |
| 2013/0027651 A1 | 1/2013 | Meldrim | |
| 2017/0075166 A1* | 3/2017 | Son | G02F 1/133514 |
| 2018/0190878 A1 | 7/2018 | Li et al. | |
| 2018/0351035 A1* | 12/2018 | Chung | H01L 27/1214 |
| 2022/0163707 A1 | 5/2022 | Yu et al. | |
| 2022/0163834 A1 | 5/2022 | Yu et al. | |
| 2022/0163845 A1 | 5/2022 | Yu et al. | |
| 2022/0163846 A1 | 5/2022 | Yu et al. | |
| 2022/0165912 A1 | 5/2022 | Yu et al. | |

FOREIGN PATENT DOCUMENTS

| | | |
|---|---|---|
| CN | 108845442 A | 11/2018 |
| JP | 2000-124313 A | 4/2000 |
| JP | 2007-193200 A | 8/2007 |
| JP | 2011-123093 A | 6/2011 |
| TW | 200415550 A | 8/2004 |
| TW | 200744127 A | 12/2007 |
| TW | 200834197 A | 8/2008 |
| TW | 200842400 A | 11/2008 |
| TW | 200916406 A | 4/2009 |
| TW | 201001009 A | 1/2010 |
| TW | 201218274 A | 5/2012 |
| TW | 202039719 A | 11/2020 |
| WO | 2020-008765 A1 | 1/2020 |

OTHER PUBLICATIONS

International Search Report and Written Opinion dated Mar. 8, 2022 in International Patent Application No. PCT/US2021/059744, 8 pages.

International Search Report and Written Opinion dated Mar. 15, 2022 in International Patent Application No. PCT/US2021/059756, 6 pages.

International Search Report and Written Opinion dated Mar. 15, 2022 in International Patent Application No. PCT/US2021/059752, 6 pages.

International Search Report and Written Opinion dated Apr. 29, 2022 in International Patent Application No. PCT/US2022/011847, 7 pages.

* cited by examiner

STRUCTURE AND METHOD OF ADVANCED LCOS BACK-PLANE HAVING ROBUST PIXEL VIA METALLIZATION

CROSS-REFERENCES TO RELATED APPLICATIONS

The present technology is related to the following applications, all concurrently filed Nov. 20, 2020, and titled: "STRUCTURE AND METHOD OF ADVANCED LCOS BACK-PLANE HAVING HIGHLY REFLECTIVE PIXEL VIA METALLIZATION", U.S. patent application Ser. No. 17/100,402, "STRUCTURE AND METHOD OF MIRROR GROUNDING IN LCOS DEVICES", U.S. patent application Ser. No. 17/100,416, "STRUCTURE AND METHOD OF BI-LAYER PIXEL ISOLATION IN ADVANCED LCOS BACK-PLANE", U.S. patent application Ser. No. 17/100,400, and "METHOD FOR LCOS DBR MULTI-LAYER STACK PROTECTION VIA SACRIFICIAL HARDMASK FOR ME AND CMP PROCESSES", U.S. patent application Ser. No. 17/100,422. The present technology is also related to "METHOD OF CMP INTEGRATION FOR IMPROVED OPTICAL UNIFORMITY IN ADVANCED LCOS BACK-PLANE", U.S. patent application Ser. No. 17/149,399, filed Jan. 14, 2021. Each of these applications is hereby incorporated by reference in their entirety for all purposes.

TECHNICAL FIELD

The present technology relates to semiconductor systems, processes, and equipment. More specifically, the present technology relates to processes and systems for forming and etching material layers on a semiconductor substrate.

BACKGROUND

Advanced liquid crystal on silicon (LCoS) devices are made possible by processes which produce intricately patterned material layers on substrate surfaces. Producing patterned material on a substrate requires controlled methods for removal of exposed material. Chemical etching is used for a variety of purposes including transferring a pattern in photoresist into underlying layers, thinning layers, or thinning lateral dimensions of features already present on the surface. Often it is desirable to have an etch process that etches one material faster than another facilitating, for example, a pattern transfer process or individual material removal. Such an etch process is said to be selective to the first material. As a result of the diversity of materials, circuits, and processes, etch processes have been developed with a selectivity towards a variety of materials.

Multilayer LCoS structures, such as those incorporating distributed Bragg reflectors (DBRs), may incorporate layers of dielectric or conducting material formed in a series of fabrication operations. In some cases, layers or structures may be formed by plasma deposition methods using an oxygen-containing plasma, such as, for example, deposition of conducting oxide films. In some cases, layers or structures may be formed by thermal deposition methods that elevate the temperature of previously formed structures, which may induce diffusion of materials between layers or structures. For example, deposition of high-k materials overlying metal structures may induce thermal diffusion of metal atoms from the metal structures into the high-k materials. Oxidation or diffusion may cause degradation of metal layers or structures in the LCoS structure, including, but not limited to, formation of voids, degradation of electrical conductivity, degradation of electrical contacts at interfaces between metal structures, or degradation of optical performance of reflective metal surfaces.

Thus, there is a need for improved systems and methods that can be used to produce high quality devices and structures. These and other needs are addressed by the present technology.

SUMMARY

Processing methods may be performed to form a pixel material in a semiconductor substrate. The methods may include forming a lithographic mask overlying the semiconductor substrate. The lithographic mask may include a window. The method may include forming a via in the semiconductor substrate by a dry etch process through the window. The method may also include forming the pixel material by depositing a fill material in the via.

In some embodiments, the fill material may be or include a refractory material selected from a set of materials resistant to plasma oxidation. The refractory material may be or include one or more of tungsten, ruthenium, or tantalum nitride. The fill material may be or include a non-refractory material. The non-refractory material may be or include one or more of aluminum, copper, or cobalt. The method may further include forming a refractory layer overlying the fill material. The refractory layer may have a thickness less than 5 nm. The refractory layer may be or include the refractory material.

The present technology also encompasses semiconductor structures including a semiconductor substrate. The structures may include a metal layer overlying the semiconductor substrate. The structures may include a spacer layer overlying the metal layer. The structures may include a mirror layer overlying the spacer layer. The structures may include an optical stack overlying the mirror layer. The structures may include a pixel material extending from the metal layer to an upper surface of the optical stack. The pixel material may be or include a refractory material.

In some embodiments, the refractory material may be selected from a set of materials resistant to plasma oxidation. The refractory layer may be or include one or more of tungsten, ruthenium, or tantalum nitride. The refractory material may extend an entire length through the optical stack. The pixel material may be electrically isolated from the mirror layer. The pixel material may form an electrically conductive contact with the metal layer. The optical stack may be or include a Distributed Bragg Reflector (DBR).

The present technology also encompasses semiconductor structures including a semiconductor substrate. The structures may include a metal layer overlying the semiconductor substrate. The structures may include a spacer layer overlying the metal layer. The structures may include a mirror layer overlying the spacer layer. The structures may include an optical stack overlying the mirror layer. The structures may include a pixel material extending from the metal layer to the optical stack. The pixel material may be or include a non-refractory metal. The structures may include a refractory layer overlying the pixel material external to the optical stack.

In some embodiments, the metal layer may be or include the non-refractory metal. The non-refractory metal may be or include one or more of copper, cobalt, or aluminum. The refractory layer may be or include one or more of tungsten, ruthenium, or tantalum nitride. The refractory layer may have a thickness less than 5 nm. The pixel material may extend a portion of a length of the optical stack, and the refractory layer may form an appreciably level surface with an upper surface of the optical stack.

Such technology may provide numerous benefits over conventional systems and techniques. For example, embodiments of the present technology may exhibit improved robustness under oxidative environments and elevated temperatures characteristic of semiconductor fabrication processes, with little to no reduction in optical performance. These and other embodiments, along with many of their advantages and features, are described in more detail in conjunction with the below description and attached figures.

Several of the figures are included as schematics. It is to be understood that the figures are for illustrative purposes, and are not to be considered of scale unless specifically stated to be of scale. Additionally, as schematics, the figures are provided to aid comprehension and may not include all aspects or information compared to realistic representations, and may include exaggerated material for illustrative purposes.

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the letter.

DETAILED DESCRIPTION

The present technology includes systems and components for semiconductor processing of liquid crystal on silicon (LCoS) back-plane devices. Semiconductor structures built with an embedded optical stack, such as a distributed Bragg reflector (DBR), can have dramatically enhanced optical performance for increased display brightness and lower power consumption relative to other reflective back-plane structures for liquid crystal displays. In an LCoS pixel structure, an optical stack, such as an embedded DBR, may be interposed between a metal layer and a liquid crystal layer, where the electrical potential for actuating the liquid crystal layer may be provided by the metal layer. For example, a pixel material may be formed through the DBR to provide an electrical contact between the metal layer and the liquid crystal layer, as, for example, when a transparent conducting film overlies the DBR. In some embodiments, as when a lateral dimension of the LCoS pixel structure approaches 5 microns or less, the relative size of the pixel material may significantly influence the optical performance of the LCoS back-plane. In this way, optical properties of materials from which the pixel material can be constructed may influence the selection of the material, weighed against resistance to oxidation and diffusion that provides improved robustness. The pixel material may be or include a metal or electrically conductive material, the composition of which can be selected to provide a robust electrical contact without reducing the optical performance of the DBR, for example, by absorbing light otherwise reflected by the DBR.

Incorporating the optical stack in the LCoS back-plane can add complexity to fabrication processes, as when incorporating layers of dielectric or conducting material formed in a series of fabrication operations. In some cases, layers or structures may be formed by deposition methods using an oxygen-containing plasma, such as, for example, deposition of conducting oxide films by plasma enhanced chemical vapor deposition. In some cases, layers or structures may be formed by thermal deposition methods whereby elevated temperatures may induce diffusion of materials between layers or structures. For example, deposition of high-k materials overlying metal structures may induce thermal diffusion of metal atoms into the high-k materials. Oxidation or diffusion may cause degradation of metal layers or structures in the LCoS structure, including, but not limited to, formation of voids, oxidation, degradation of electrical conductivity, degradation of electrical contacts at interfaces between metal structures, or degradation of optical performance of reflective metal surfaces.

The present technology overcomes such limitations through an improved pixel material structure and fabrication method, as described below. In some embodiments, the methods include forming a pixel material to connect an underlying metal layer and an overlying transparent conductive layer. The pixel material may be or include a refractory material selected to provide improved robustness of the pixel material during subsequent fabrication operations, such as forming pixel isolation structures. Furthermore, the pixel material may be or include a non-refractory material to provide an electrical contact with the underlying metal layer, having limited reduction on the highly reflective upper surface of the DBR. In some embodiments, the pixel material can include both refractory and non-refractory materials, disposed in a manner to provide both robustness and reflectance, as described below.

Although the remaining disclosure will routinely identify specific etching processes utilizing the disclosed technology, it will be readily understood that the systems and methods are equally applicable to deposition and cleaning processes as may occur in the described chambers. Accordingly, the technology should not be considered to be so limited as for use with etching processes alone. The disclosure will discuss one possible system and chamber that can be used with the present technology to perform certain of the removal operations before describing operations of an exemplary process sequence according to the present technology.

Figure 1:
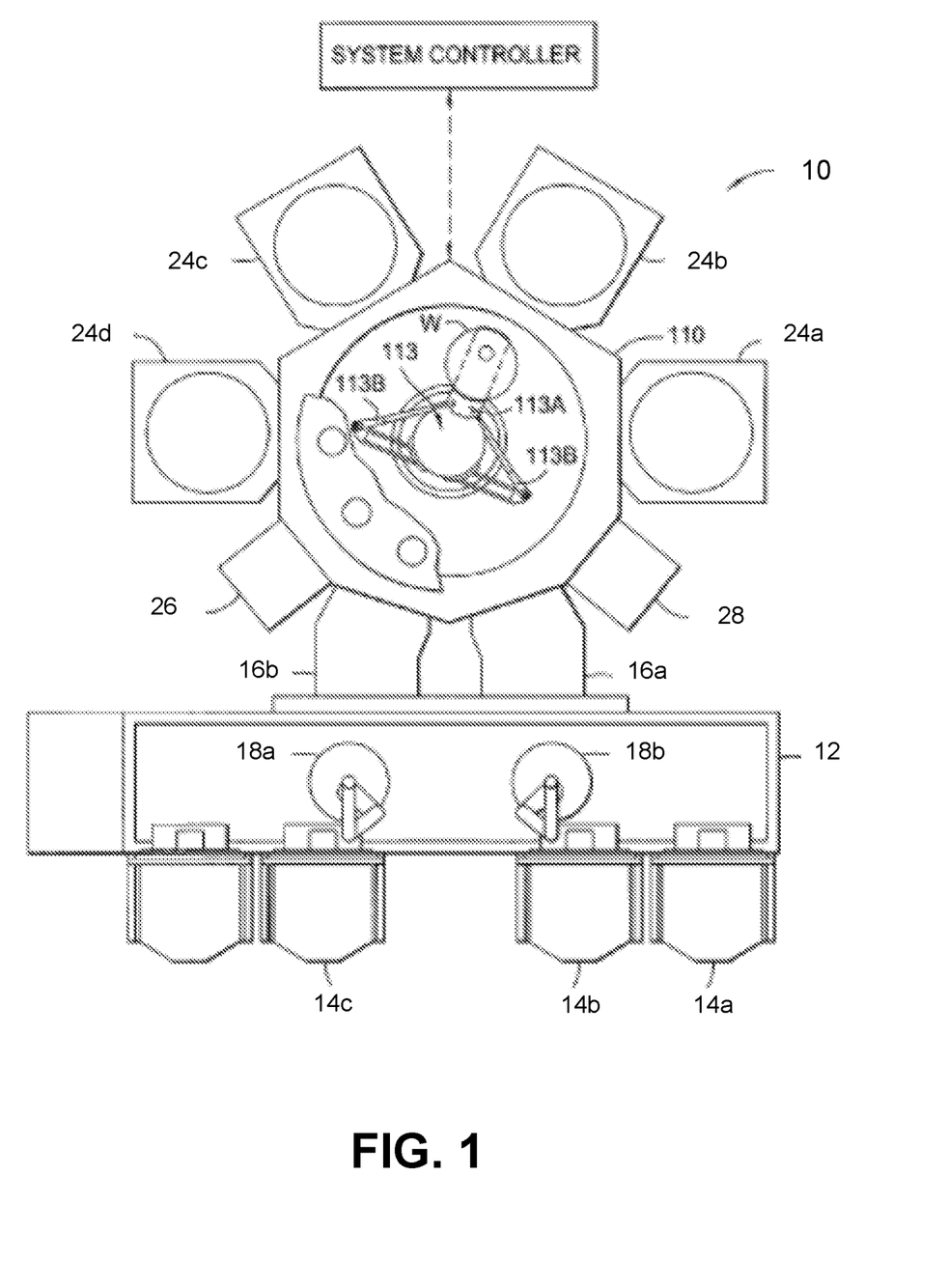
FIG. 1 shows a schematic top plan view of an exemplary processing system according to some embodiments of the present technology.

FIG. 1 shows a top plan view of one embodiment of a processing system 10 of deposition, etching, baking, and/or curing chambers according to embodiments. The tool or processing system 10 depicted in FIG. 1 may contain a plurality of process chambers, 24a-d, a transfer chamber 20, a service chamber 26, an integrated metrology chamber 28, and a pair of load lock chambers 16a-b. The process chambers may include any number of structures or components, as well as any number or combination of processing chambers.

To transport substrates among the chambers, the transfer chamber 20 may contain a robotic transport mechanism 22. The transport mechanism 22 may have a pair of substrate transport blades 22a attached to the distal ends of extendible arms 22b, respectively. The blades 22a may be used for carrying individual substrates to and from the process chambers. In operation, one of the substrate transport blades such as blade 22a of the transport mechanism 22 may retrieve a substrate W from one of the load lock chambers such as chambers 16a-b and carry substrate W to a first stage of processing, for example, a treatment process as described below in chambers 24a-d. The chambers may be included to perform individual or combined operations of the described technology. For example, while one or more chambers may be configured to perform a deposition or etching operation, one or more other chambers may be configured to perform a pre-treatment operation and/or one or more post-treatment operations described. Any number of configurations are encompassed by the present technology, which may also perform any number of additional fabrication operations typically performed in semiconductor processing.

If the chamber is occupied, the robot may wait until the processing is complete and then remove the processed substrate from the chamber with one blade 22a and may insert a new substrate with a second blade. Once the substrate is processed, it may then be moved to a second stage of processing. For each move, the transport mechanism 22 generally may have one blade carrying a substrate and one blade empty to execute a substrate exchange. The transport mechanism 22 may wait at each chamber until an exchange can be accomplished.

Once processing is complete within the process chambers, the transport mechanism 22 may move the substrate W from the last process chamber and transport the substrate W to a cassette within the load lock chambers 16a-b. From the load lock chambers 16a-b, the substrate may move into a factory interface 12. The factory interface 12 generally may operate to transfer substrates between pod loaders 14a-d in an atmospheric pressure clean environment and the load lock chambers 16a-b. The clean environment in factory interface 12 may be generally provided through air filtration processes, such as HEPA filtration, for example. Factory interface 12 may also include a substrate orienter/aligner that may be used to properly align the substrates prior to processing. At least one substrate robot, such as robots 18a-b, may be positioned in factory interface 12 to transport substrates between various positions/locations within factory interface 12 and to other locations in communication therewith. Robots 18a-b may be configured to travel along a track system within factory interface 12 from a first end to a second end of the factory interface 12.

The processing system 10 may further include an integrated metrology chamber 28 to provide control signals, which may provide adaptive control over any of the processes being performed in the processing chambers. The integrated metrology chamber 28 may include any of a variety of metrological devices to measure various film properties, such as thickness, roughness, composition, and the metrology devices may further be capable of characterizing grating parameters such as critical dimensions, sidewall angle, and feature height under vacuum in an automated manner.

Each of processing chambers 24a-d may be configured to perform one or more process steps in the fabrication of a semiconductor structure, and any number of processing chambers and combinations of processing chambers may be used on multi-chamber processing system 10. For example, any of the processing chambers may be configured to perform a number of substrate processing operations including any number of deposition processes including cyclical layer deposition, atomic layer deposition, chemical vapor deposition, physical vapor deposition, as well as other operations including etch, pre-clean, pre-treatment, post-treatment, anneal, plasma processing, degas, orientation, and other substrate processes. Some specific processes that may be performed in any of the chambers or in any combination of chambers may be metal deposition, surface cleaning and preparation, thermal annealing such as rapid thermal processing, and plasma processing. Any other processes may similarly be performed in specific chambers incorporated into multi-chamber processing system 10, including any process described below, as would be readily appreciated by the skilled artisan.

Figure 2:
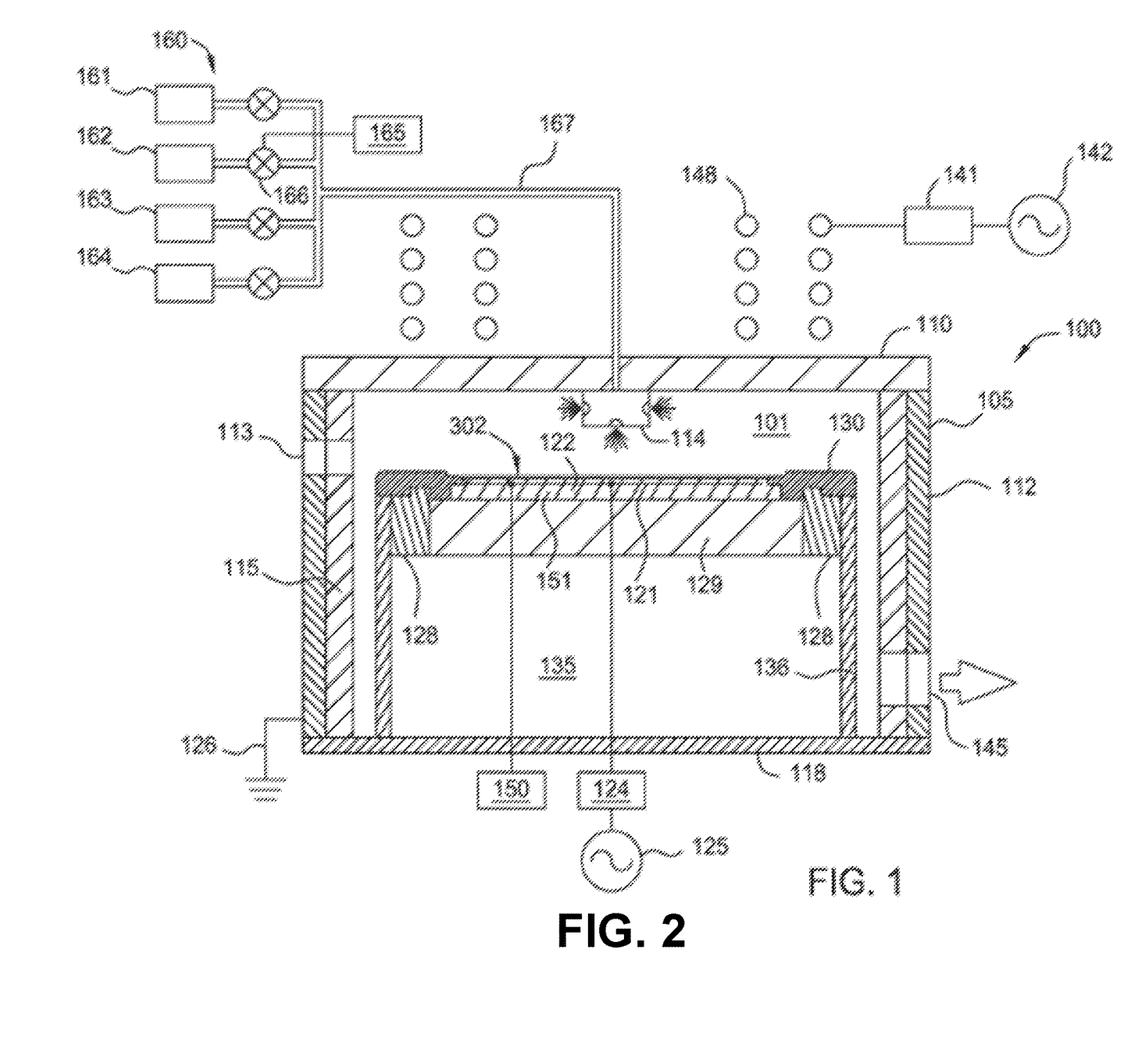
FIG. 2 shows a schematic cross-sectional view of an exemplary processing system according to some embodiments of the present technology.

FIG. 2 illustrates a schematic cross-sectional view of an exemplary processing chamber 100 suitable for patterning a material layer disposed on a substrate 302 in the processing chamber 100. The exemplary processing chamber 100 is suitable for performing a patterning process, although it is to be understood that aspects of the present technology may be performed in any number of chambers, and substrate supports according to the present technology may be included in etching chambers, deposition chambers, treatment chambers, or any other processing chamber. The plasma processing chamber 100 may include a chamber body 105 defining a chamber volume 101 in which a substrate may be processed. The chamber body 105 may have sidewalls 112 and a bottom 118 which are coupled with ground 126. The sidewalls 112 may have a liner 115 to protect the sidewalls 112 and extend the time between maintenance cycles of the plasma processing chamber 100. The dimensions of the chamber body 105 and related components of the plasma processing chamber 100 are not limited and generally may be proportionally larger than the size of the substrate 302 to be processed therein. Examples of substrate sizes include 200 mm diameter, 250 mm diameter, 300 mm diameter and 450 mm diameter, among others, such as display or solar cell substrates as well.

The chamber body 105 may support a chamber lid assembly 110 to enclose the chamber volume 101. The chamber body 105 may be fabricated from aluminum or other suitable materials. A substrate access port 113 may be formed through the sidewall 112 of the chamber body 105, facilitating the transfer of the substrate 302 into and out of the plasma processing chamber 100. The access port 113 may be coupled with a transfer chamber and/or other chambers of a substrate processing system as previously described. A pumping port 145 may be formed through the sidewall 112 of the chamber body 105 and connected to the chamber volume 101. A pumping device may be coupled through the pumping port 145 to the chamber volume 101 to evacuate and control the pressure within the processing volume. The pumping device may include one or more pumps and throttle valves.

A gas panel 160 may be coupled by a gas line 167 with the chamber body 105 to supply process gases into the chamber volume 101. The gas panel 160 may include one or more process gas sources 161, 162, 163, 164 and may additionally include inert gases, non-reactive gases, and reactive gases, as may be utilized for any number of processes. Examples of process gases that may be provided by the gas panel 160 include, but are not limited to, hydrocarbon containing gas including methane, sulfur hexafluoride, silicon chloride, tetrafluoromethane, hydrogen bromide, hydrocarbon containing gas, argon gas, chlorine, nitrogen, helium, or oxygen gas, as well as any number of additional materials. Additionally, process gasses may include nitrogen, chlorine, fluorine, oxygen, and hydrogen containing gases such as $BCl_3$, $C_2F_4$, $C_4F_8$, $C_4F_6$, $CHF_3$, $CH_2F_2$, $CH_3F$, $NF_3$, $NH_3$, $CO_2$, $SO_2$, CO, $N_2$, $NO_2$, $N_2O$, and $H_2$, among any number of additional precursors.

Valves 166 may control the flow of the process gases from the sources 161, 162, 163, 164 from the gas panel 160 and may be managed by a controller 165. The flow of the gases supplied to the chamber body 105 from the gas panel 160 may include combinations of the gases form one or more sources. The lid assembly 110 may include a nozzle 114. The nozzle 114 may be one or more ports for introducing the process gases from the sources 161, 162, 164, 163 of the gas panel 160 into the chamber volume 101. After the process gases are introduced into the plasma processing chamber 100, the gases may be energized to form plasma. An antenna 148, such as one or more inductor coils, may be provided adjacent to the plasma processing chamber 100. An antenna power supply 142 may power the antenna 148 through a match circuit 141 to inductively couple energy, such as RF energy, to the process gas to maintain a plasma formed from the process gas in the chamber volume 101 of the plasma processing chamber 100. Alternatively, or in addition to the antenna power supply 142, process electrodes below the substrate 302 and/or above the substrate 302 may be used to capacitively couple RF power to the process gases to maintain the plasma within the chamber volume 101. The operation of the power supply 142 may be controlled by a controller, such as controller 165, that also controls the operation of other components in the plasma processing chamber 100.

A substrate support pedestal 135 may be disposed in the chamber volume 101 to support the substrate 302 during processing. The substrate support pedestal 135 may include an electrostatic chuck 122 for holding the substrate 302 during processing. The electrostatic chuck ("ESC") 122 may use the electrostatic attraction to hold the substrate 302 to the substrate support pedestal 135. The ESC 122 may be powered by an RF power supply 125 integrated with a match circuit 124. The ESC 122 may include an electrode 121 embedded within a dielectric body. The electrode 121 may be coupled with the RF power supply 125 and may provide a bias which attracts plasma ions, formed by the process gases in the chamber volume 101, to the ESC 122 and substrate 302 seated on the pedestal. The RF power supply 125 may cycle on and off, or pulse, during processing of the substrate 302. The ESC 122 may have an isolator 128 for the purpose of making the sidewall of the ESC 122 less attractive to the plasma to prolong the maintenance life cycle of the ESC 122. Additionally, the substrate support pedestal 135 may have a cathode liner 136 to protect the sidewalls of the substrate support pedestal 135 from the plasma gases and to extend the time between maintenance of the plasma processing chamber 100.

Electrode 121 may be coupled with a power source 150. The power source 150 may provide a chucking voltage of about 200 volts to about 2000 volts to the electrode 121. The power source 150 may also include a system controller for controlling the operation of the electrode 121 by directing a DC current to the electrode 121 for chucking and de-chucking the substrate 302. The ESC 122 may include heaters disposed within the pedestal and connected to a power source for heating the substrate, while a cooling base 129 supporting the ESC 122 may include conduits for circulating a heat transfer fluid to maintain a temperature of the ESC 122 and substrate 302 disposed thereon. The ESC 122 may be configured to perform in the temperature range required by the thermal budget of the device being fabricated on the substrate 302. For example, the ESC 122 may be configured to maintain the substrate 302 at a temperature of about −150° C. or lower to about 500° C. or higher depending on the process being performed.

The cooling base 129 may be provided to assist in controlling the temperature of the substrate 302. To mitigate process drift and time, the temperature of the substrate 302 may be maintained substantially constant by the cooling base 129 throughout the time the substrate 302 is in the cleaning chamber. In some embodiments, the temperature of the substrate 302 may be maintained throughout subsequent cleaning processes at temperatures between about −150° C. and about 500° C., although any temperatures may be utilized. A cover ring 130 may be disposed on the ESC 122 and along the periphery of the substrate support pedestal 135. The cover ring 130 may be configured to confine etching gases to a desired portion of the exposed top surface of the substrate 302, while shielding the top surface of the substrate support pedestal 135 from the plasma environment inside the plasma processing chamber 100. Lift pins may be selectively translated through the substrate support pedestal 135 to lift the substrate 302 above the substrate support pedestal 135 to facilitate access to the substrate 302 by a transfer robot or other suitable transfer mechanism as previously described.

The controller 165 may be utilized to control the process sequence, regulating the gas flows from the gas panel 160 into the plasma processing chamber 100, and other process parameters. Software routines, when executed by the CPU, transform the CPU into a specific purpose computer such as a controller, which may control the plasma processing chamber 100 such that the processes are performed in accordance with the present disclosure. The software routines may also be stored and/or executed by a second controller that may be associated with the plasma processing chamber 100.

Figure 3:
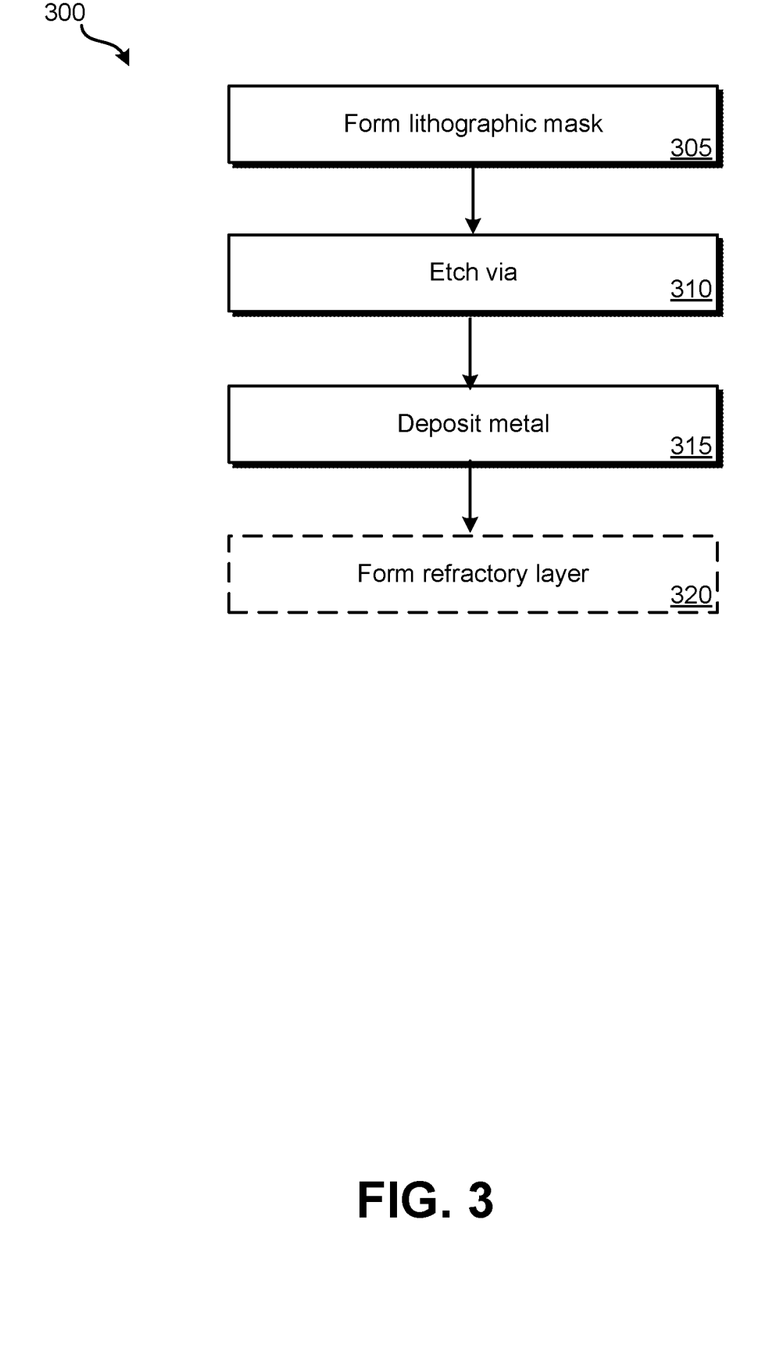
FIG. 3 shows selected operations in a method of forming a pixel material on a semiconductor substrate according to some embodiments of the present technology.

FIG. 3 shows selected operations in a method 300 of forming a pixel material on a semiconductor substrate according to some embodiments of the present technology. Many operations of method 300 may be performed, for example, in the chamber 100 as previously described. Method 300 may include one or more operations prior to the initiation of the method, including front end processing, deposition, etching, polishing, cleaning, or any other operations that may be performed prior to the described operations. The method may include optional operations as denoted in the figure, which may or may not be specifically associated with some embodiments of methods according to the present technology. For example, many of the operations are described in order to provide a broader scope of the structural formation, but are not critical to the technology, or may be performed by alternative methodology as will be discussed further below. Method 300 describes operations shown schematically in FIGS. 4A-4G, the illustrations of which will be described in conjunction with the operations of method 300. It is to be understood that FIG. 4 illustrates only partial schematic views, and a substrate may contain any number of semiconductor sections having aspects as illustrated in the figures, as well as alternative structural aspects that may still benefit from aspects of the present technology. Method 300 may involve optional operations to develop the semiconductor structures to a particular fabrication operation.

Figure 4A:
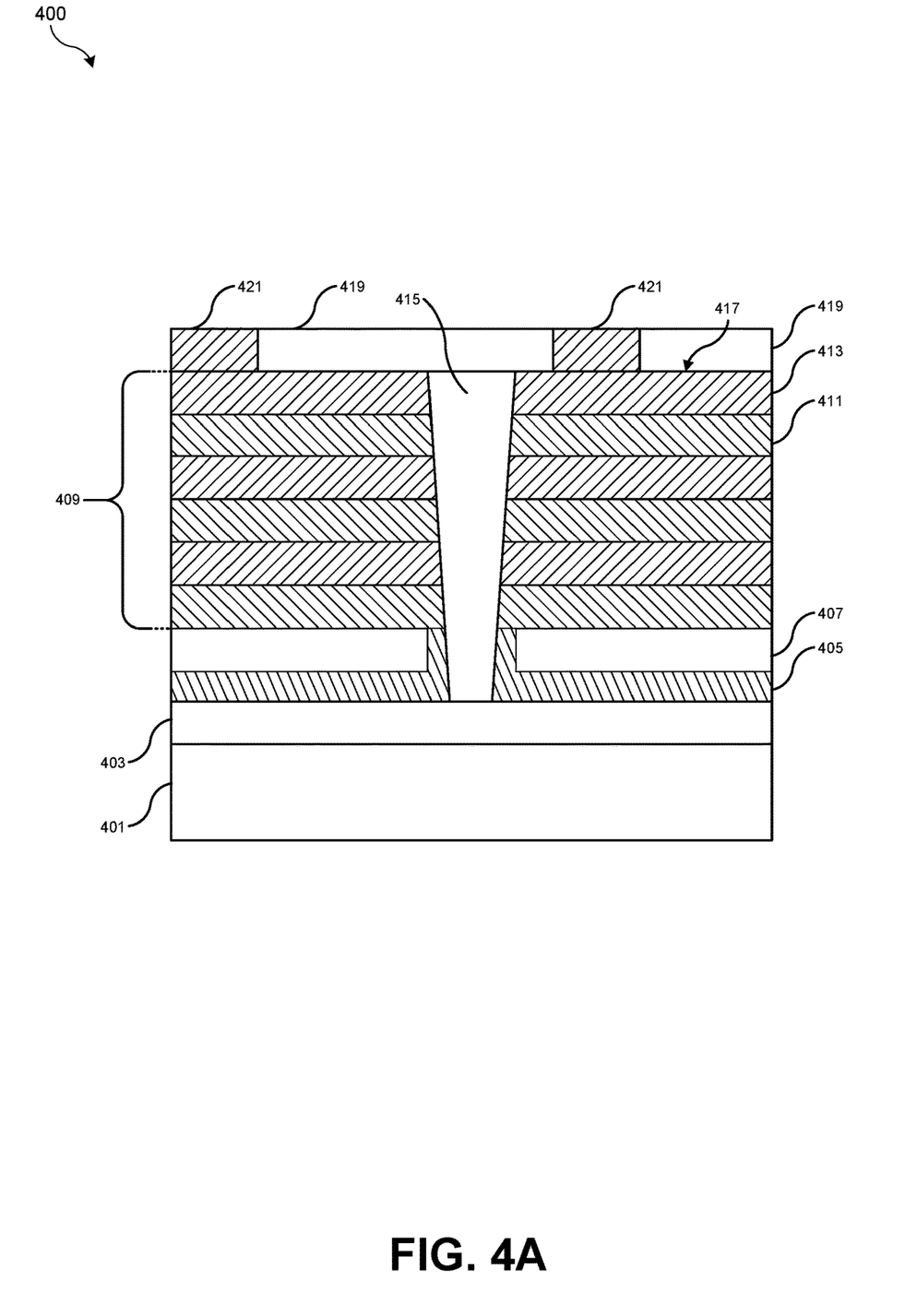
FIGS. 4A-4G illustrate schematic cross-sectional views of substrate materials on which selected operations are being performed according to some embodiments of the present technology.

In the context of method 300, the semiconductor structure 400 may define an active pixel, where the active pixel is described in reference to FIG. 4A. At one or more points in the formation processes leading to the semiconductor structure 400, the operations of method 300 may be implemented to form a conductive contact between constituent layers of the semiconductor structure 400, as described in reference to FIGS. 4B-4G. A resulting display device, formed by a process including the operations of method 300, may incorporate a semiconductor structure 400 having a robust metallized pixel, and may therefore exhibit reduced degradation during one or more fabrication processes subsequent the operations of method 300.

As illustrated in FIG. 4A, the semiconductor structure 400 may represent a liquid crystal on silicon (LCoS) back-plane comprising one or more constituent structures forming an active pixel. As illustrated, structure 400 may include a substrate 401 made of or containing silicon or some other semiconductor substrate material, on which the one or more structures of the LCoS back-plane may be formed. For example, structure 400 may include a metal layer 403, formed, for example, from copper or another metal compatible with semiconductor processing techniques. Structure 400 may further include a reflective and conductive mirror layer 407 that may be or include aluminum, copper, or another reflective material suitable for providing a mirror surface. To electrically insulate the mirror layer 407 from the metal layer 403, a spacer material 405 may be formed overlying the metal layer 403 prior to forming the mirror layer 407. The structure may include an optical stack providing a reflective backing structure. As illustrated, the optical stack can be or include a distributed Bragg reflector 409 (DBR), which may be formed overlying the mirror layer 407. In some embodiments, the optical stack may include other reflective layers or structures, including, but not limited to dielectric mirrors or other high-reflection coatings, In some embodiments, the DBR 409 may include multiple alternating layers of high-k and low-k dielectric materials. For example, low-k layers 411 may be or include a low-k dielectric material, such as silicon oxide or organosilicate glass. By contrast, high-k layers 413 may be or include a high-k dielectric material, such as tantalum oxide.

For further implementation in LCoS devices, the semiconductor structure may include a pixel material 415. As illustrated, the pixel material 415 may extend from an upper surface 417 of the DBR 409 and contact the metal layer 403, which may provide a conductive path between the metal layer 403 and the upper surface 417, through an aperture in the mirror layer 407 and the DBR 409. As described in more detail in reference to the forthcoming figures, the pixel material 415 may be or include a metal or a refractory material selected for suitability with downstream processing operations such as high-temperature deposition and reactive ion etching.

In some embodiments, the mirror layer 407 may be physically separated from active electrical components of the structure 400 to prevent a short-circuit from affecting multiple pixels, as when the mirror layer 407 spans multiple pixels on the LCoS device. For example, in structure 400, the mirror layer 407 may be electrically isolated from the metal layer 403 and the pixel material 415. By contrast, the pixel material may be in electrical contact with an overlying transparent conductive layer 419 formed on regions of the upper surface 417. In some embodiments, the transparent conductive layer 419 may be or include a transparent conductive oxide, such as indium tin oxide (ITO) or aluminum doped zinc oxide, or a transparent conductive coating incorporating carbon allotropes including, but not limited to, graphene, diamond like carbon, or carbon nanotubes. The transparent conductive layer 419 may provide transparency over one or more wavelength ranges and a conductive contact to energize and actuate a liquid crystal layer overlying the structure 400.

Forming the transparent conductive layer 419 may include plasma deposition techniques. For example, in the case of ITO, forming the transparent conductive layer 419 may include, but is not limited to, plasma enhanced chemical vapor deposition, chemical vapor deposition, spray pyrolysis, reactive e-beam evaporation, sputtering, or physical vapor deposition. Deposition of the transparent conductive layer 419 may be conducted in an oxidative environment, at elevated temperatures, or both. In some embodiments, forming the transparent conductive layer 419 may include baking operations, for example, in cases of conductive films formed by spin-coating. During the course of such operations, the pixel material 415 may be exposed to reactive environments, oxidizing environments, or elevated temperatures, which may induce degradation and may negatively impact the electrical contact formed between the metal layer 403 and the transparent conductive layer 419.

In some embodiments, pixels may be defined by pixel isolation structures 421 formed on the upper surface 417, such that an individual pixel may include a pixel material 415 and a transparent conductive layer 419, between two pixel isolation structures 421. In some embodiments, the LCoS backplane may include multiple pixels having the same structure 400, from which a display system may be formed having an array of addressable pixels. The pixel isolation structures 421 may be or include a high-k material, such as the high-k material 413. In some embodiments, deposition of the pixel isolation structures 421 may be conducted at elevated temperatures at which the material of the pixel material 415 may diffuse into the DBR 409 or the pixel isolation structures 421. For example, when the pixel material 415 is formed of a non-refractory material selected for high reflectance or electrical conductivity, the pixel material 415 may be susceptible to degradation during formation of the pixel isolation structures 421.

Figure 4B:
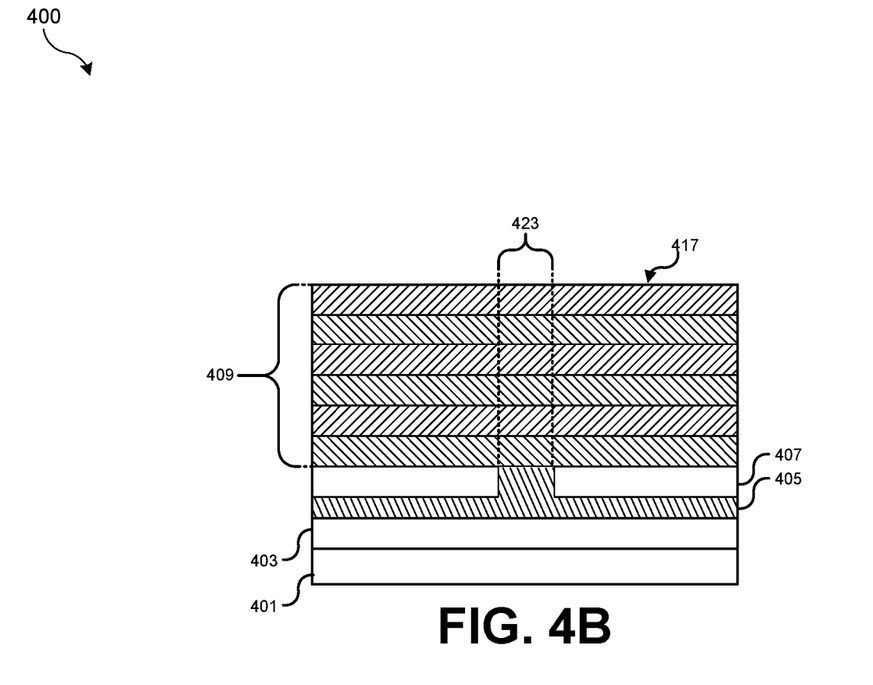
Figure 4C:
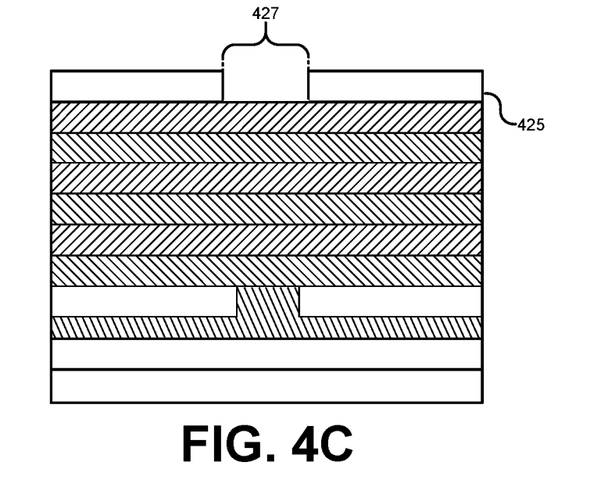

At operation 305, a lithographic mask 425 may be formed on an upper surface 417 of the DBR 409, as illustrated in FIG. 4B. The lithographic mask 425 may include a window 427 at the position of the window 423. The lithographic mask 425 can be or include a softmask, a hard mask, or may be formed from a material selected to shield the upper surface 417 of the DBR 409 from subsequent etch processes. In some embodiments, the window 427 may have a width corresponding to a maximal width of the pixel material 415 of FIG. 4A.

Figure 4D:
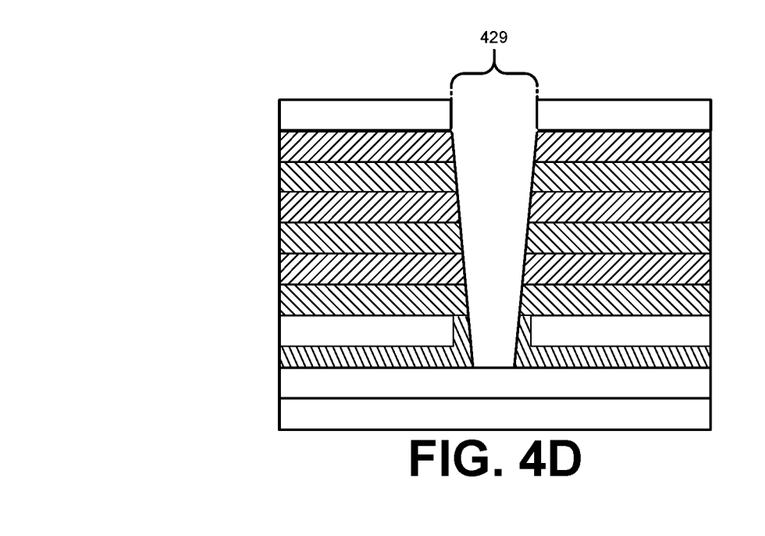

Subsequent forming the lithographic mask 425, a via 429 may be formed at operation 310, as illustrated in FIG. 4D. The via 429 may be formed by a dry etch process to selectively remove portions of the DBR 409, the mirror layer 407, and the spacer material 405, to reveal the metal layer 403. The via 429 may taper toward the metal layer 403. The taper may facilitate subsequent fill operations and may facilitate forming an electrical connection between the pixel material 415 and the metal layer 403 in subsequent operations of the method 300. As illustrated in FIG. 4D, at the mirror layer 407, the via 429 may be laterally narrower than the width of the window 423, such that the via 429 may form one or more sloped sidewalls extending from the surface of the DBR 417 to the metal layer 403, without intersecting the mirror layer 407.

Figure 4E:
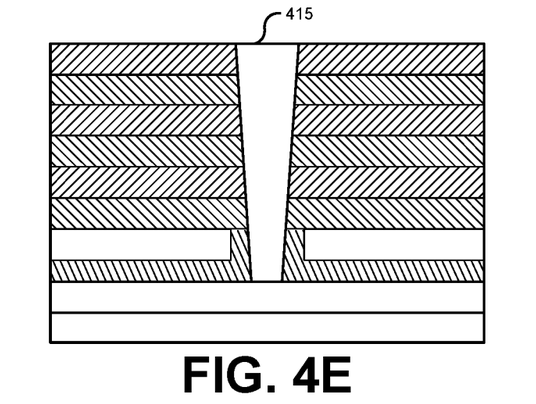

Subsequent forming the via 429, the pixel material 415 may be formed at operation 315, as illustrated in FIG. 4E. Operation 315 may include depositing a fill material in the via 429 by one or more processes including, but not limited to chemical vapor deposition, atomic layer deposition, physical vapor deposition, or other techniques compatible with semiconductor fabrication. Similarly, operation 315 may include one or more additional processes, such as removal of excess material to reveal the upper surface 417 of the DBR 409. For example, chemical mechanical polishing may be employed to remove material deposited to form the pixel material 415 during operation 315. In some embodiments, alternative selective removal techniques may be employed, such as wet etching or dry etching, ion milling, or e-beam techniques to selectively remove the material deposited external the via 429.

In some embodiments, the pixel material 415 may be or include a material selected for stability under semiconductor fabrication processes including, but not limited to, thermal deposition, plasma-deposition, oxygen etch, or those producing other reactive environments that may induce oxidation, thermal diffusion or other degradation in non-refractory metals. In some embodiments, the pixel material 415 can be or include tungsten, ruthenium, or tantalum nitride. As described in reference to FIG. 4A, the pixel material 415 may be formed prior to deposition of overlying layers or structures including, but not limited to, the transparent conductive layer 419 or the pixel isolation structures 421. The overlying layers or structures may be formed under elevated temperatures or in reactive or oxidizing environments, where a non-refractory material may be susceptible to degradation. As such, the pixel material 415 may incorporate a refractory material, such as those selected to resist oxidation, or those exhibiting a reduced diffusivity at process temperatures relative to non-refractory materials such as copper or cobalt.

The pixel material 415 may form an electrical contact with the metal layer 403. In some embodiments, non-refractory materials, such as copper, cobalt, or aluminum, may present beneficial properties for inclusion as materials from which to construct the pixel material 415. For example, non-refractory materials may exhibit relatively high reflectance and electrical conductivity, which may facilitate the electrical connection between the metal layer 403 to the transparent conductive layer 419 without significantly impacting the optical performance of the overall structure 400. The susceptibility of non-refractory materials to degradation during subsequent fabrication processes, as described above, may be reduced by depositing a temporary protective layer, such as a diffusion barrier layer, that may be selectively removed as part of forming the overlying structures, such as the pixel isolation structures 421. In some embodiments, the non-refractory materials may be protected by a refractory layer, as described below.

Figure 4F:
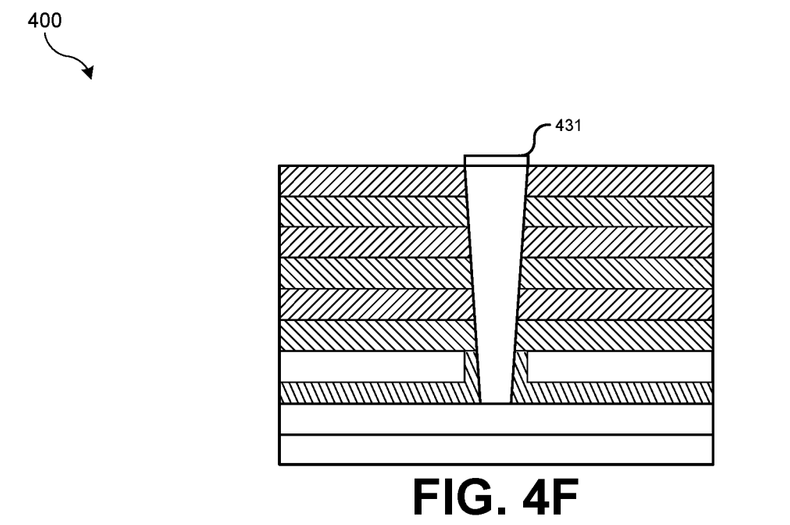
Figure 4G:
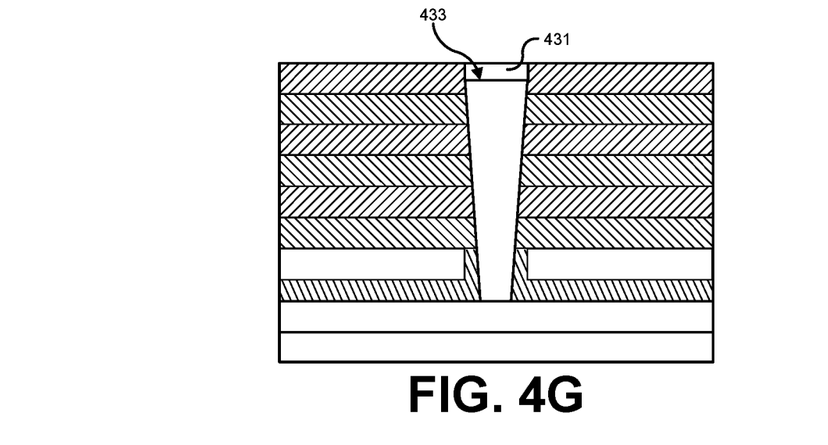

In some embodiments, the method 300 may include optional operations. For example, subsequent formation of the pixel material 415 at operation 315, the method 300 may include operation 320. As illustrated in FIG. 4F and FIG. 4G, a refractory layer 431 may be formed overlying the pixel material 415. To potentially reduce the effect of the refractory layer 431 on the optical performance of the structure 400, in some embodiments, the refractory layer 431 may be formed selectively overlying the pixel material 415, such that the refractory layer 431 does not overly the upper surface 417 of the DBR 409. In some embodiments, operation 320 may include forming the refractory layer 431 by one or more techniques including, but not limited to, atomic layer deposition, physical vapor deposition, chemical vapor deposition, plasma enhanced chemical vapor deposition, e-beam deposition, epitaxial techniques, or sputtering. In some cases, operation 320 may include additional procedures to facilitate selective deposition of the refractory layer 431, such as masking or selective removal of refractory material external to the pixel material 415.

The refractory layer 431 can be or include a refractory material selected to resist the fabrication conditions employed during formation of the transparent conductive layer 419 or the pixel isolation structures 421, and thereby protect the underlying pixel material 415. For example, the refractory layer 431 can be or include ruthenium, tungsten, or tantalum nitride. Materials from which the refractory layer 431 may be formed may exhibit a reduced reflectance relative to the upper surface 417 of the DBR 409 or a non-refractory material. In some cases, the effect of the refractory layer 431 may be mitigated by controlling the thickness of the refractory layer 431. In this way, the refractory layer may protect the underlying pixel material 415 with negligible impact on optical performance of the structure 400. For example, the refractory layer 431 may be effectively transparent below a threshold thickness, but may still shield a non-refractory material included in the pixel material 415 from degradation. For example, in some embodiments, the refractory material may be less than 10 nm thick to maintain a substantially transparent characteristic, and may be less than or about 5 nm thick, less than 4 nm thick, less than 3 nm thick, less than 1 nm thick, less than 1 nm thick, or less, although in some embodiments the thickness may be greater than or about 1 nm to ensure complete coverage to protect the pixel material 415 without appreciably impairing the optical performance of the structure 400.

In some embodiments, the pixel material 415 may extend a portion of the length of the optical stack, resulting in the pixel material 415 being recessed below the upper surface 417. For example, the pixel material 415 may fill a portion of the via 429, leaving a recess between an upper surface 433 of the pixel material 415 and the upper surface 417 of the DBR. In some embodiments, the recess may have a depth less than 1 nm, less than 2 nm, less than 3 nm, less than 4 nm, less than 5 nm, less than 10 nm, or larger. In some cases, the refractory layer 431 may be formed within the recess, such that it at least partially fills the recess. As illustrated in FIG. 4G, the refractory layer 431 may be formed within the recess, and as such, extend beneath the upper surface 417 of the DBR 409. In some embodiments, the refractory layer 431, as illustrated in FIG. 4G, may provide an appreciably level surface with the upper surface 417 of the DBR 409. The refractory layer 431 may protect the underlying non-refractory material in the pixel material 415. Beyond a threshold thickness, however, the refractory material may absorb light and negatively impact the optical performance of the structure 800. As such, depositing the refractory layer 431 below a threshold thickness, as described above, may provide the advantages of protecting the refractory material from thermal and chemical degradation while reducing the impact of the refractory material on optical performance. In this way, depositing a partial fill in the recess may provide an appreciably level surface over which to form the subsequent structures, while also protecting the non-refractory pixel material 415 and improving optical performance of the structure 400.

In the preceding description, for the purposes of explanation, numerous details have been set forth in order to provide an understanding of various embodiments of the present technology. It will be apparent to one skilled in the art, however, that certain embodiments may be practiced without some of these details, or with additional details.

Having disclosed several embodiments, it will be recognized by those of skill in the art that various modifications, alternative constructions, and equivalents may be used without departing from the spirit of the embodiments. Additionally, a number of well-known processes and elements have not been described in order to avoid unnecessarily obscuring the present technology. Accordingly, the above description should not be taken as limiting the scope of the technology.

Where a range of values is provided, it is understood that each intervening value, to the smallest fraction of the unit of the lower limit, unless the context clearly dictates otherwise, between the upper and lower limits of that range is also specifically disclosed. Any narrower range between any stated values or unstated intervening values in a stated range and any other stated or intervening value in that stated range is encompassed. The upper and lower limits of those smaller ranges may independently be included or excluded in the range, and each range where either, neither, or both limits are included in the smaller ranges is also encompassed within the technology, subject to any specifically excluded limit in the stated range. Where the stated range includes one or both of the limits, ranges excluding either or both of those included limits are also included.

As used herein and in the appended claims, the singular forms "a", "an", and "the" include plural references unless the context clearly dictates otherwise. Thus, for example, reference to "a layer" includes a plurality of such layers, and reference to "the precursor" includes reference to one or more precursors and equivalents thereof known to those skilled in the art, and so forth.

Also, the words "comprise(s)", "comprising", "contain(s)", "containing", "include(s)", and "including", when used in this specification and in the following claims, are intended to specify the presence of stated features, integers, components, or operations, but they do not preclude the presence or addition of one or more other features, integers, components, operations, acts, or groups.

What is claimed is:

1. A method of manufacturing a semiconductor structure, the method comprising:
   forming a semiconductor substrate;
   forming a metal layer overlying the semiconductor substrate;
   forming a spacer layer overlying the metal layer;
   forming a mirror layer overlying the spacer layer;
   forming an optical stack overlying the mirror layer, wherein the optical stack comprises a Distributed Bragg Reflector (DBR);
   forming a lithographic mask overlying the DBR, the lithographic mask comprising a window;
   forming a via by a dry etch process through the window to selectively remove portions of the DBR, the mirror layer and the spacer layer; and
   forming the pixel material extending from the metal layer to an upper surface of the optical stack by depositing a fill material in the via.

2. The method of claim 1, wherein the fill material comprises a refractory material selected from a set of materials resistant to plasma oxidation.

3. The method of claim 2, wherein the refractory material comprises one or more of tungsten, ruthenium, or tantalum nitride.

4. The method of claim 1, wherein the fill material comprises a non-refractory material.

5. The method of claim 4, wherein the non-refractory material comprises one or more of aluminum, copper, or cobalt.

6. The method of claim 4, further comprising:
   forming a refractory layer overlying the fill material, the refractory layer comprising a refractory material selected from a set of materials resistant to plasma oxidation.

7. The method of claim 6, wherein the refractory layer has a thickness less than 5 nm.

8. A semiconductor structure comprising:
   a semiconductor substrate;
   a metal layer overlying the semiconductor substrate;
   a spacer layer overlying the metal layer;
   a mirror layer overlying the spacer layer;
   an optical stack overlying the mirror layer, wherein the optical stack comprises a Distributed Bragg Reflector (DBR); and
   a pixel material extending from the metal layer to an upper surface of the optical stack, the pixel material comprising a refractory material.

9. The semiconductor structure of claim 8, wherein the refractory material is selected from a set of materials resistant to plasma oxidation.

10. The semiconductor structure of claim 8, wherein the refractory material comprises one or more of tungsten, ruthenium, or tantalum nitride.

11. The semiconductor structure of claim 10, wherein the refractory material extends an entire length through the optical stack.

12. The semiconductor structure of claim 8, wherein the pixel material is electrically isolated from the mirror layer.

13. The semiconductor structure of claim 8, wherein the pixel material forms an electrically conductive contact with the metal layer.

14. A semiconductor structure comprising:
   a semiconductor substrate;
   a metal layer overlying the semiconductor substrate;
   a spacer layer overlying the metal layer;
   a mirror layer overlying the spacer layer;
   an optical stack overlying the mirror layer;
   a pixel material extending from the metal layer to the optical stack, the pixel material comprising a non-refractory metal; and
   a refractory layer overlying the pixel material external to the optical stack, wherein the refractory layer comprises one or more of tungsten, ruthenium, or tantalum nitride.

15. The semiconductor structure of claim 14, wherein the metal layer comprises the non-refractory metal.

16. The semiconductor structure of claim 14, wherein the non-refractory metal comprises one or more of copper, cobalt, or aluminum.

17. The semiconductor structure of claim 14, wherein the refractory layer has a thickness less than 5 nm.

18. The semiconductor structure of claim 14, wherein:
   the pixel material extends a portion of a length of the optical stack; and
   the refractory layer forms an appreciably level surface with an upper surface of the optical stack.

* * * * *